April 29, 1958     A. E. KIRSCHNER, JR     2,832,887

COMPENSATED CHARGE STORAGE CIRCUIT

Filed Nov. 4, 1955

INVENTOR
ADELBERT E. KIRSCHNER, JR.
BY
ATTORNEY

United States Patent Office 2,832,887
Patented Apr. 29, 1958

2,832,887

COMPENSATED CHARGE STORAGE CIRCUIT

Adelbert E. Kirschner, Jr., Valley Stream, N. Y., assignor to Sperry Rand Corporation, a corporation of Delaware Application November 4, 1955, Serial No. 545,097

4 Claims. (Cl. 250—27)

This invention relates to charge storage circuits, and more particularly, is concerned with a compensated storage circuit which maintains a constant charge periodically applied to a capacitor despite the natural tendency of the capacitor to discharge because of leakage.

It is frequently desirable in electrical computers, or other similar devices, to generate a D. C. voltage proportional to the peak amplitude of an information pulse of varying amplitude and be able to maintain the D. C. voltage for a period of time. This is generally accomplished by charging a capacitor to the peak amplitude of the information pulse. However, where the time interval between the successive information pulses is considerably extended and it is desired to maintain the D. C. voltage over an extended time interval, difficulty in such a type of circuit may be encountered due to the natural leakage of the charge from the capacitor resulting either from internal leakage within the capacitor or leakage through the external circuit connected across the capacitor.

It is the general object of this invention to provide an improved storage circuit in which compensation for leakage of charge from the storage capacitor is provided.

This is accomplished by coupling the storage capacitor to the control grid of a pentode. A compensating capacitor, charged to a fixed potential, is coupled through a vacuum tube to the screen grid of the pentode to control the gain of the pentode. As the charge on the compensating capacitor leaks off, the potential of the screen grid is varied to compensate for the change in the control grid voltage of the pentode. As a result the plate potential of the pentode is maintained substantially constant for a greatly extended time interval.

Figure 1:
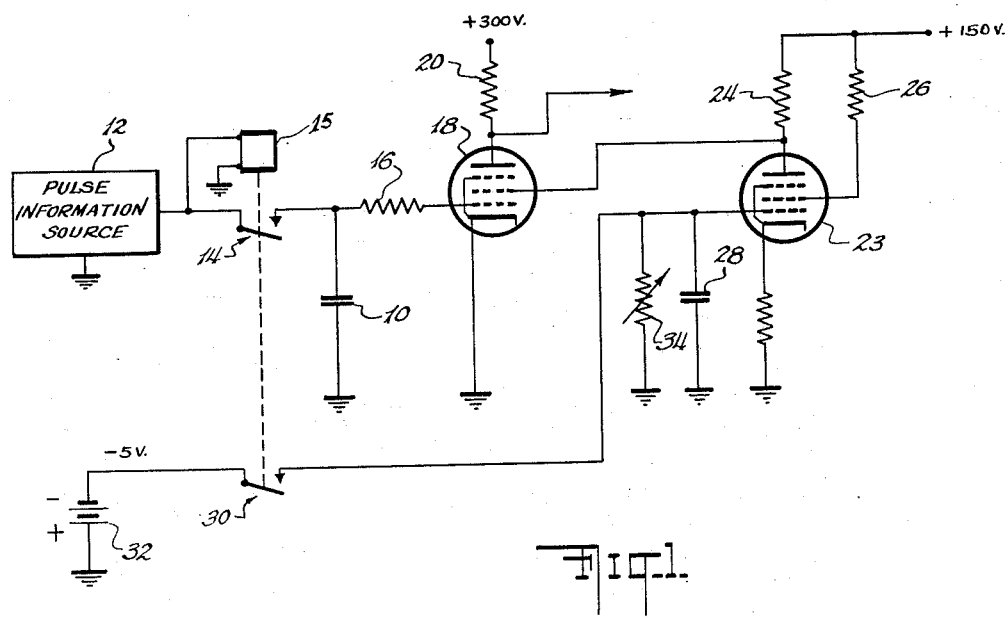
Figure 2:
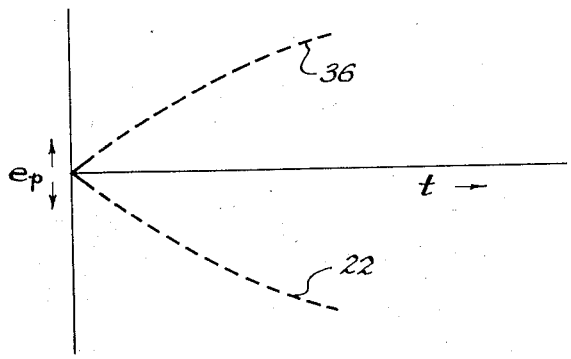

For a better understanding of the invention, reference should be had to the accompanying drawings, wherein:

Fig. 1 is a schematic diagram of the compensated storage circuit of the present invention; and Fig. 2 is a diagram illustrating the mode of operation of the circuit of Fig. 1.

Referring to Fig. 1, the numeral 10 indicates generally a storage capacitor which is charged negatively with respect to ground in response to pulses received from an information source 12 through a suitable switching circuit 14. The source 12 is indicated generally since, for the purpose of the present invention, it may take a variety of forms. The source is characterized by the fact that it produces information pulses varying in amplitude in response to some measurable quantity. The switching circuit 14 is actuated by a relay 15 from the pulse output of the source 12, the switch being closed for the duration of the pulse. While a relay switch has been shown and described, where the pulses are of very short duration, a faster acting electronic type switch may be utilized. The output impedance of the pulse source 12 is preferably quite low so that the capacitor 10 will be discharged through the source when the pulse amplitude is less than the existing charge on the capacitor 10.

The storage capacitor 10 is coupled through a resistor 16 to the control grid of a pentode vacuum tube 18. The plate of the pentode tube 18 is connected through a plate resistor 20 to a B+ supply (not shown), with the desired D. C. output voltage proportional to the charge on the capacitor 10 being derived from the plate of the pentode 18.

In the operation of the circuit as thus far described, it will be seen that the potential on the plate of the pentode 18 immediately following a pulse from the source 12 is proportional to the amplitude of the received pulse due to the charging of the capacitor 10. However, the natural tendency of the capacitor 10 to discharge causes the plate voltage of the pentode 18 to drop from its initial level, as indicated by the dotted line 22 in Fig. 2.

To compensate for leakage discharge of the capacitor 10 and to maintain the output at the plate of the pentode 18 substantially constant over an extended period of time, the screen grid potential of the pentode 18 is controlled to vary the gain of the pentode.

This is accomplished by means of a second pentode vacuum tube 23. B+ voltage is applied to the plate of the pentode through a plate resistor 24 while the screen grid of the pentode 23 is connected to the B+ supply through a screen resistor 26, to provide the proper operating potentials to the pentode 23. The control grid of the pentode 23 is connected to a compensating capacitor 28 that is charged through a switch 30 from a negative potential source 32. The switch 30 may be actuated by the relay 15 or in response to any other means as may be available. It is necessary that the capacitor 28 be charged at the same time as the storage capacitor 10. As the charge leaks off the capacitor 28 at a controlled rate, as through a variable leakage resistor 34, the plate potential in the pentode 23 begins to fall. By connecting the pentode 18, the screen grid of the plate of the pentode 23 to the screen grid of the pentode 18 is caused to drop at a rate determined by the discharge of the compensating capacitor 28. Reducing the screen potential of the pentode 18 results in the plate current being reduced, causing the plate potential to rise, as indicated by the dotted line 36 of Fig. 2. By proper control of the discharge rate of the capacitor 28 and the charging potential provided by the source 32, substantial compensation for the discharge of the storage capacitor 10 can be achieved, and the output level at the plate of the pentode 18 held substantially constant until the charge on the compensating capacitor 28 is practically discharged. For example, consider a circuit having the following circuit constants:

Storage capacitor 10=.1 μfd.
Resistor 16=680K
Resistor 20=110K
Pentode 18=6AH6
Compensating capacitor 28=.47 μfd.
Resistor 24=20K
Resistor 26=20K
Resistor 34=10 meg.
Pentode 23=6AV6

With potentials applied as indicated in Fig. 1, such circuit provides a maximum drift of ±.05 volt in five seconds, at which time the pentode 23 has reached maximum conduction and no further compensation exists. This is in contrast to an output drift of the order of ±1.25 volts in five seconds without compensation, or a 25 to 1 improvement in drift within the compensating time interval.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A compensated storage circuit producing a direct current output voltage in response to an input pulse comprising a first vacuum tube including a cathode, a control grid, a screen grid and a plate, a storage capacitor connected across the cathode and the control grid of the first tube, a second vacuum tube including a cathode, a control grid and a plate, the plate of the second tube being coupled to the screen grid of the first tube, a compensating capacitor connected across the cathode and the control grid of the second tube, switch means for coupling the input pulse to the storage capacitor to charge the storage capacitor to the peak of the pulse, and switch means for momentarily coupling the compensating capacitor to a potential source during the interval in which the charge on the storage capacitor is being set by the input pulse, the direct current output voltage being derived from the plate of the first tube.

2. A compensated storage circuit producing a direct current output voltage in response to an input pulse comprising a first vacuum tube including a cathode, a control grid, a screen grid and a plate, a storage capacitor connected across the cathode and the control grid of the first tube, a second vacuum tube including a cathode, a control grid and a plate, the plate of the second tube being coupled to the screen grid of the first tube, a compensating capacitor connected across the cathode and the control grid of the second tube, means for coupling the input pulse to the storage capacitor to charge the storage capacitor to the peak of the pulse, and means for momentarily coupling the compensating capacitor to a potential source during the interval in which the charge on the storage capacitor is being set by the input pulse, the direct current output voltage being derived from the plate of the first tube.

3. A compensated storage circuit producing a direct current output voltage in response to an input pulse comprising a first vacuum tube including a cathode, a pair of grids and a plate, a storage capacitor connected across said cathode and one of said grids of the first tube, a second vacuum tube including a cathode, a grid and a plate, the plate of the second tube being coupled to the other grid of the first tube, a compensating capacitor connected across the cathode and the grid of the second tube, means for coupling the input pulse to the storage capacitor to charge the storage capacitor to the peak of the pulse, and means for momentarily coupling the compensating capacitor to a potential source during the interval in which the charge on the storage capacitor is being set by the input pulse, the direct current output voltage being derived from the plate of the first tube.

4. Apparatus for producing a direct current proportional to the amplitude of an input pulse, said apparatus comprising a first capacitor charged by the input pulse to the peak voltage of the pulse, said first capacitor having a predetermined leakage discharge rate, first amplifier means having a high input impedance coupled across said first capacitor for producing an output voltage responsive to the charge on said first capacitor, a second capacitor, means for charging said second capacitor simultaneously with the charging of the first capacitor, adjustable means for controlling the rate of discharge of said second capacitor, and means including second amplifier means having a high input impedance coupled across said second capacitor and adapted by means of an output coupled to said first amplifier means for varying the gain of said first amplifier means in response to the changes in the potential across said second capacitor as it discharges, said adjustable means for controlling the rate of discharge of the second capacitor being adjusted to change the gain of the first amplifier at a rate such as to compensate for the drop in potential across the first capacitor at said pretermined leakage discharge rate, whereby the output of the first amplifying means is maintained substantially constant in spite of leakage of charge from the first capacitor over an extended time period.

References Cited in the file of this patent

UNITED STATES PATENTS

| | | |
|---|---|---|
| 2,293,528 | Barco et al. | Aug. 18, 1942 |
| 2,576,617 | Loughren | Nov. 27, 1951 |

U. S. DEPARTMENT OF COMMERCE
PATENT OFFICE

CERTIFICATE OF CORRECTION

Patent No. 2,832,887    Adelbert E. Kirschner, Jr.      April 29, 1958

It is hereby certified that error appears in the printed specification of the above numbered patent requiring correction and that the said Letters Patent should read as corrected below.

Column 2, line 59, for "6AV6" read -- 6AU6 --; column 4, line 12, after "current" insert -- potential --.

Signed and sealed this 1st day of July 1958.

(SEAL)
Attest:

KARL H. AXLINE
Attesting Officer

ROBERT C. WATSON
Commissioner of Patents